(12) United States Patent
Katayama et al.

(10) Patent No.: US 6,613,999 B2
(45) Date of Patent: Sep. 2, 2003

(54) METHOD OF JOINING A SINTERED HARD ALLOY MEMBER TO A STAINLESS STEEL MEMBER AND METHOD OF MAKING A CUTTING TOOL THEREFROM

(75) Inventors: Ichiro Katayama, Nagaoka (JP); Hideo Wakui, Tokyo (JP)

(73) Assignee: Union Tool Company, Tokyo (JP)

( * ) Notice: Subject to any disclaimer, the term of this patent is extended or adjusted under 35 U.S.C. 154(b) by 0 days.

(21) Appl. No.: 10/001,831

(22) Filed: Nov. 19, 2001

(65) Prior Publication Data

US 2002/0060206 A1 May 23, 2002

(30) Foreign Application Priority Data

Nov. 20, 2000 (JP) .......................................... 2000-353246

(51) Int. Cl.[7] .............................. B23K 9/04; B23K 11/02
(52) U.S. Cl. ..................... 219/77; 219/78.01; 219/91.2; 219/117.1
(58) Field of Search ....................... 219/77, 91.2, 78.01, 219/117.1; 228/122.1

(56) References Cited

U.S. PATENT DOCUMENTS

| 4,101,318 | A | * | 7/1978 | Rudy | .......................... 75/240 |
| 4,628,178 | A | * | 12/1986 | Miyake et al. | ......... 219/121.64 |
| 5,296,677 | A | * | 3/1994 | Takahashi et al. | ..... 219/146.41 |
| 5,361,693 | A | * | 11/1994 | Farb et al. | ................ 101/93.04 |
| 6,323,458 | B1 | * | 11/2001 | Nomura et al. | ............. 219/148 |
| 6,437,280 | B1 | * | 8/2002 | Sharma | .................... 219/117.1 |
| 2002/0060206 | A1 | * | 5/2002 | Katayama et al. | |

FOREIGN PATENT DOCUMENTS

| JP | 55010330 | A | * | 1/1980 |
| JP | 401122675 | A | * | 5/1989 |
| JP | 406142942 | A | * | 5/1994 |
| JP | 406199580 | A | * | 7/1994 |

OTHER PUBLICATIONS

Translation of JP-406199580A.*

* cited by examiner

Primary Examiner—Tom Dunn
Assistant Examiner—Kiley Stoner
(74) Attorney, Agent, or Firm—William L. Chapin

(57) ABSTRACT

A method of joining a sintered hard alloy member 1 such as a cylindrical rod-shaped twist drill bit blank made of material whose main component is tungsten carbide to a softer metal member such as a stainless steel shank 2 includes the steps of connecting the hard alloy member 1 and the metal member 2 to separate electrodes 3 and 4, applying a longitudinally directed force couple to the hard alloy member 1 and metal member 2 to press end faces of the members together to form an electrically conductive contact region, and passing a pulse of current through electrodes 3 and 4 of sufficient energy to melt the two end face regions of the members, thereby welding them together. Preferably, the end face of the metal member has a convex conical shape.

37 Claims, 1 Drawing Sheet

METHOD OF JOINING A SINTERED HARD ALLOY MEMBER TO A STAINLESS STEEL MEMBER AND METHOD OF MAKING A CUTTING TOOL THEREFROM

BACKGROUND OF THE INVENTION

1. Field of the Invention

The present invention relates to methods for joining a sintered hard alloy member to a supporting member made of a softer metal. More particularly, the invention relates to a method of joining a member such as tungsten carbon alloy rod to a member such as a stainless steel shank, and the method of making a cutting tool such as a twist drill bit from the joined members.

2. Description of Background Art

Sintered hard alloys whose main component is tungsten carbide and which include cobalt, tantalum, chrome or the like, have exceptionally high hardness, and are routinely used as materials from which cutting tools such as twist drills are manufactured. Thus, for example, twist drill bits, especially those used for drilling hard or abrasive materials such as glass-filled printed circuit boards, are manufactured from a sintered hard alloy blank having the shape of a rod which is machined to form a cylindrical rear shank portion adapted to be clamped in the collet of a drill, and a smaller diameter front rod-shaped portion in which is machined a conical cutting point and helically disposed cutting edges.

Drill bits in which both the cutting part and shank part of the bit are made of a single piece of relatively expensive sintered hard alloy have a relatively high raw materials cost. Moreover, since the diameter of the front cutting portion of most drill bits is smaller than that of the rear shank portion, substantial machining time is required to reduce the diameter of the cutting part to a reduced size, and sintered hard alloy material removed during the machining process is wasted.

Because of the relatively higher cost and brittleness of sintered hard alloys compared to other metals such as stainless steel, some cutting tools such as certain drill bits are manufactured as a composite structure, in which a cutting members or surfaces thereof are made of a sintered hard alloy, such as tungsten carbide, and a supporting structure for the hard alloy cutting member which is generally made of a softer, less expensive, more readily machinable material such as stainless steel.

In an example of a prior art composite drill bit structure, a cylindrical cavity is formed in the front end face of a stainless steel rod, and a sintered hard alloy rod is shrink-fitted into the cavity. Cutting surfaces are then machined in the hard alloy rod to form a completed twist drill.

Drill bits made as composite structures as described in the foregoing example are more economical to manufacture than drill bits made entirely of a sintered hard alloy material. However, shrink fitting a hard alloy rod into a cavity within a stainless steel shank rod requires very accurate machining of the cavity. Also, the length of the sintered hard alloy material inserted into the shank cavity adds to the length required of the sintered hard alloy beyond that required for cutting surfaces, thus adding to the cost of the composite drill bits manufactured by this method.

The present invention was conceived of to provide an economical method of joining a sintered hard alloy member to a stainless steel member to thereby make a composite structure in which the two members are firmly bonded to one another, and a method of making a cutting tool from the composite structure.

OBJECTS OF THE INVENTION

An object of the present invention is to provide a method of joining a sintered hard alloy member to a softer metal supporting member.

Another object of the invention is to provide a method of joining a sintered hard alloy member to a stainless steel member.

Another object of the invention is to provide a method of joining a carbide alloy member to a stainless steel member.

Another object of the invention is to provide a method of joining a sintered hard alloy member to a softer metal member, which does not require forming a cavity in the softer member.

Another object of the invention is to provide a method of joining a sintered hard alloy member to a softer metal member having a circular end face.

Another object of the invention is to provide a method of joining a sintered hard alloy member to a softer metal member having a conically-shaped end face.

Another object of the invention is to provide a method of joining a sintered hard alloy rod to a softer metal shank having a transverse end face, the method including the steps of exerting a longitudinally disposed force on the rod relative to the shank to thereby exert pressure on a contact region between the shank and rod end faces, and applying a pulse of electrical current through the contact region sufficient to cause melting and melding of material from the rod and shank at the junction between them.

Another object of the invention is to provide a method of joining a sintered, hard alloy rod to a softer metal shank having a conically-shaped transverse end face, the method including the steps of exerting a longitudinally disposed force on the rod relative to the shank to thereby exert pressure on a contact region between the conical shank end face and rod end face, and applying a pulse of electrical current through the contact region sufficient to cause melting and melding of material from the rod and shank at the junction between them.

Another object of the invention is to provide a method of manufacturing a cutting tool structure including the steps of forcing an end face of a hard alloy rod member against the end face of a shank made of a softer metal, passing a pulse of electrical current through a contact region between the shank and rod member end faces sufficient to melt and meld the shank and rod member together at the contact region, and forming a cutting surface on the hard alloy rod member.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends a method of joining a sintered hard alloy member such as a drill bit rod blank made of a material such as tungsten carbide, to a softer metal member such as a stainless steel shank to thereby form a strong composite structure and of machining cutting surfaces on the hard alloy member part of the composite structure to make a cutting tool.

According to the invention, an end face, e.g., the front end face of a stainless steel shank and an end face of a hard alloy rod are pressed against each other at a contact region, and a pulse of electrical current passed between the rod and shank through the contact region. The current pulse is sufficiently energetic to cause localized melting of both hard alloy member and shank end faces, thus causing molecules of both members to intermingle, meld, and form a diffusion bonded weld upon cooling. As a result of this process, a hard alloy carbide drill bit rod blank and a stainless steel shank, for example, are welded together with a bonding strength that is as great as the fracture strength of the rod.

In a preferred embodiment of the invention, a convex conical end surface is formed in a transverse end face of a stainless steel shank, thus centrally localizing pressure and heating during the aforementioned welding process.

According to the invention, cutting edges are machined in the hard alloy rod after it has been welded to the shank, to form a finished drill bit.

DESCRIPTION OF THE PREFERRED EMBODIMENTS

Certain advantages of a method for joining a sintered hard alloy member to a stainless steel shank according to the present invention may be better appreciated by briefly reviewing a prior art joining method.

Figure 1:
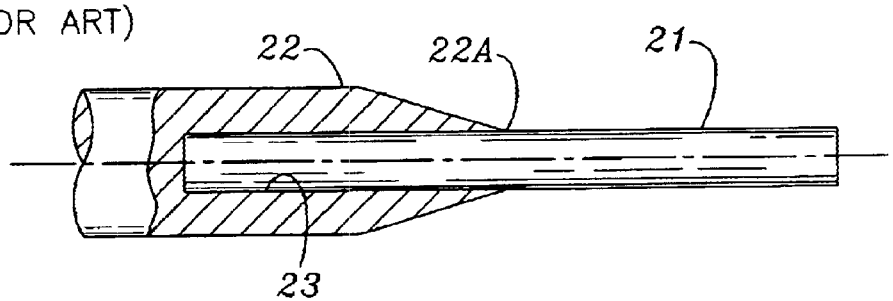
FIG. 1 is a sectional view of a prior art composite member.

Thus, as shown in FIG. 1, a prior art method for joining a sintered hard alloy rod 21 to a cylindrically-shaped stainless steel shank 22 includes the steps of forming a generally cylindrically-shaped cavity 23 coaxially in an end face 22A of the shank, and shrink-fitting the sintered alloy rod within the cavity. As stated above, this method requires very accurate machining of cavity 23. Furthermore, the method requires a rod, which made of relatively costly sintered hard alloy material, that is substantially longer than that required for cutting surfaces, because of the portion of the rod which is held within cavity 23.

Figure 2:
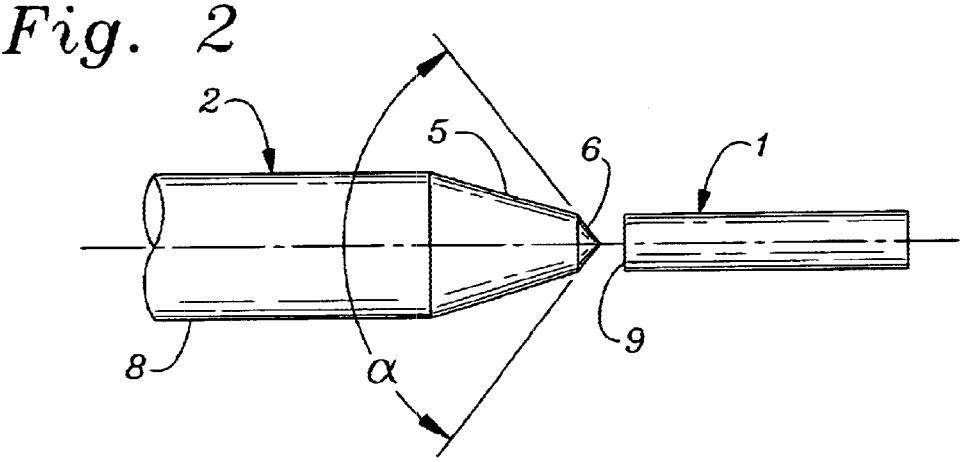
FIG. 2 is a side elevation view of a stainless steel shank and hard alloy rod member to be joined together according to the present invention.

Referring now to FIG. 24, a method of joining a sintered hard alloy rod member to a stainless steel shank member according to the present invention may be seen to include a generally cylindrically-shaped hard sintered alloy rod member 1, and a generally cylindrically-shaped, stainless steel shank member 2. As shown in FIGS. 1 and 2, shank member 2 has a circular transverse cross section transverse front end face 6, and may have a generally frustro-conically-shaped, forward tapered transition section 7 between the front end face and rear cylindrical portion 8 of the shank.

As may be seen best by referring to FIG. 2, front transverse end face 6 of shank 2 preferably has a convex conical shape which has a vertex angle of between about 150 degrees and about 180 degrees. The front most portion of shank end face 6 preferably is the convex vertex of a cone, and has a diameter equal to or less than the diameter of sintered hard alloy rod 1. As is also shown in FIG. 2, rod 1 preferably has a flat rear face 9 which is disposed perpendicularly to the longitudinal axis of the rod.

A method for joining sintered hard alloy rod 1 to stainless steel shank 2 according to the present invention includes clamping the shank to an electrode 4 fixed to a work table 11, and clamping hard alloy rod 1 to another electrode 3. A force couple F—F is then applied to electrodes 3 and 4 to press front conical end face 6 of shank 2 against rear face 9 of hard alloy rod 1. A pair of terminals of an electrical energy storage device such as a capacitor charged to a predetermined voltage is then electrically connected to electrodes 3 and 4, thus delivering a pulse of electrical current containing a predetermined amount of energy to junction 13 between faces 6 and 9 of shank 2 and rod 1.

In an example embodiments of a method of joining a sintered hard alloy member to a stainless steel member according to the present invention, cylindrical rods made of a sintered hard alloy whose main component is commercial tungsten carbide were joined to cylindrical shanks made of a martensite based stainless steel such as SUS440C, SUS420F, SUS420J2, and SUS410. Rear surface 9 of hard alloy rod 1 was flat in the test examples, and front surface 6 of shank 2 had a convex conical shape with a vertex angle of about slightly more than 150 degrees to about slightly less than 180 degrees.

Due to the conical shape of front face 6 of shank 2, when a pulse of current is passed through junction 13 between the front face and the rear face 9 of hard alloy rod 2, the current density per unit area is relatively high because the diameter of the convex conical tip of front face 6 is relatively small. Thus, because of the high current density, contact area 13 readily melts, resulting in a strong welded bond between hard alloy rod and stainless steel shank 2, a fact that was experimentally verified. Also in the test examples, the tip of the convex conical face 6 of stainless steel shank 2 had a diameter which was equal to or smaller than the diameter of sintered hard alloy rod 1. It was experimentally verified that the aforementioned size relationship increases the bonding strength between sintered hard alloy rod 1 and stainless steel shank 2.

When a pulse of current is passed through junction 13 between sintered hard alloy rod 1 and stainless steel shank 21, the above-mentioned convex conical part of the stainless steel shank and its surroundings melt, and the molten metal, or melt, covers the surroundings, of the joint surface with sintered hard alloy member 1.

It is believed that if this melt covered a wider area of the joint surface of the sintered hard alloy rod 1, the heat of the melt would cause a change in the composition of the sintered hard alloy rod, thus reducing the strength of the welded joint formed between the shank and rod. Also, even if the joint surface of stainless steel shank 2 has a flat shape rather than a convex conical shape, for the reasons described above, if the diameter of the joint surface of the stainless steel shank 2 is smaller than the joint surface of the sintered hard alloy rod 1, the bonding strength is increased, another fact which was experimentally verified.

In a series of tests of example embodiments of a method according to the present invention, current pulses having a duration of 2, 4 and 10 milliseconds were used, with each current pulse delivering an adjustable energy of between 100 watt seconds and 200 watt seconds to a junction 13 having a diameter of about 1.20 mm. In the course of these tests, it was experimentally determined that if the energy delivered to junction 13 was less than 100 watt-seconds, sintered hard alloy member 1 and stainless steel shank 2 do not meld sufficiently and the bonding strength decreases. Conversely, if the energy delivered to junction 13 is greater than 200 watt-seconds, the melted region of stainless steel shank 2 in particular becomes excessively large, the melt covers a wide area of the joint surface of sintered hard alloy member 1, and the bond strength is reduced.

In a series of tests of the method of the present invention, the force used to press sintered hard alloy rod 1 against stainless steel shank 2 was varied between 49 and 120 Newtons (N), i.e., 5 and 12 kilograms force (kgf).

In varying the force pressing sintered hard alloy rod 1 against shank 2, it was experimentally verified that forces less then about 49 N resulted in inadequate intermingling or melding of material melted from the hard alloy rod and shank, reducing the bond strength. Conversely, if the force exerted to press sintered hard alloy rod 1 against stainless steel shank 2 exceeded about 120 N, it was found the convex conical tip 6 of shank 2 and its surrounding melt excessively, also resulting in reduced bond strength.

Figure 3:
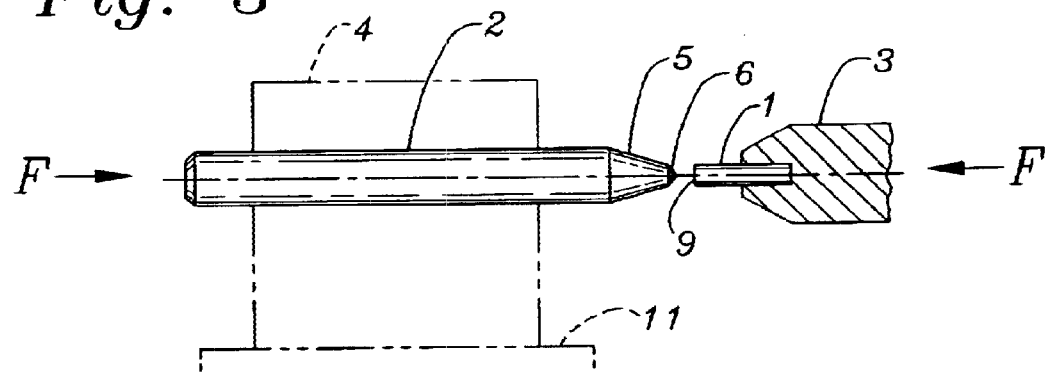
FIG. 3 is a partly sectional elevation view showing a method of joining the shank rod of FIG. 2.
Figure 4:
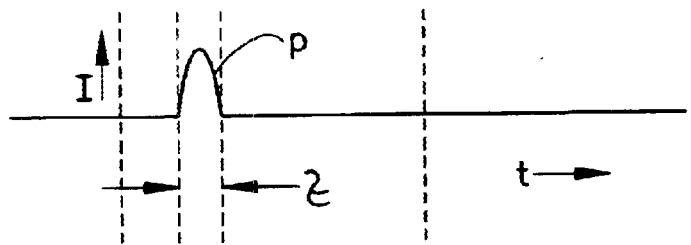
FIG. 4 is a waveform diagram showing in general the time history of a current pulse applied as part of the method of FIG. 3.

In a specific example of an application of a method of joining a sintered hard alloy cutting member to a stainless steel shank according to the present invention, sintered hard alloy member 1 was a cylindrical tungsten carbide rod having a diameter of 1.42 mm. The vertex angle of convex conical end face 6 of stainless steel shank 2 was 170 degrees, and the circular base of the convex conical end face had a diameter of 1.20 mm. As shown in FIG. 3, a longitudinal force couple of 102N (10 kgf) was exerted on sintered hard alloy rod 1 and stainless steel shank 2, the force being directed perpendicular to flat rear face 9 of the sintered hard alloy rod. Electrodes 3 and 4 were then electrically connected to the terminals of an energy storage capacitor previously charged to a voltage calculated to deliver 120 watt-seconds of energy to junction 13 between rod 1 and shank 2, in a generally triangular-shaped current pulse having a duration of about 4 milliseconds. The voltage to which the capacitor must be charged to deliver a current pulse containing a predetermined amount of energy to junction 13 can be calculated based on a measurement of the electrical contact resistance of junction 13 between rod 1 and shank 2. For example, delivering a generally triangularly-shaped 4-millisecond current pulse having an energy of 120 watt-seconds to junction 13 having a contact resistance of 0.1 ohm requires a peak voltage of about 77 volts. From this voltage value, the required capacitance of an energy storage capacitor required to store 120 watt-seconds can be calculated from the equation $E=\frac{1}{2} CV^2$. Thus, for the present example, the capacitor had a value of 40,000 mfd, and was charged to a voltage of about 77 volts.

Normal forces of 5, 10, and 12 kgf exert a pressure on the circular end face 6 of 1.20 mm diameter shank 2 pressures of $4.42 \times 10^6$ kgf/meter$^2$, $8.84 \times 10^6$ kgf/meter$^2$ and $10.6 \times 10^6$ kgf/meter$^2$, respectively. In a preferred embodiment, end face 6 has a conical shape, the vertex of which has a smaller diameter than its circular base diameter of 1.20 mm or less. Accordingly, the initial pressure exerted on end face 6 during the welding process described above would be larger than the three values stated above.

After joining sintered hard alloy (tungsten carbide) rod 1 and stainless steel shank 2 with a current pulse as described above, the cylindrical surface of the hard alloy rod was machined down to a diameter of 1 mm. Test weights of various sizes were then applied to exert a longitudinal tensile force on sintered hard alloy rod 1 relative to stainless steel shank 2. The results obtained in this experiment showed a bonding strength of at least 26.5 N (2.7 kgf). Since the breaking weight of a 0.25 mm drill produced from a tungsten carbide rod 1 is 0.49 N (0.05 kgf), the bonding strength of welded junction 13 obtained by the present method made as described above is considered practically sufficient. Moreover, in typical commercial drill bits, even when a front cutting portion of a drill bit manufactured from a sintered hard alloy rod 1 is as small as 0.25 mm, the diameter of the rod at the joint between the rod and the stainless steel shank 2 is at least 1 mm or more.

The tests performed in the foregoing practical example of a method according to the present invention confirm the fact that a sintered hard alloy member whose main component is tungsten carbide can be joined together in a strong bond with a stainless steel shank, and at a low cost. The method that is particularly well suited for utilization in the manufacture of drill bits for printed circuit board processing with excellent strength, durability, and precise dimensions. Also, because the method of the present invention eliminates the need for inserting into a cavity within a stainless steel shank a sintered hard alloy member 1, as shown in the prior art example of FIG. 2, substantially less of the relatively expensive sintered hard alloy material is required by the method of the present invention, resulting in significant cost savings as compared to prior art methods. In addition, because there is no need to form a precisely dimensional cavity in a stainless steel member, according to the method of the present invention, as in the prior art example illustrated in FIG. 2 and described above, the present method affords additional cost savings. Additionally, even if the diameter of a shank part such as stainless steel shank 2 is larger than the diameter of the cutting part, such as sintered hard alloy rod 1, the diameter of the rod may be close to that of a finished cutting part, thus minimizing the raw materials cost and machining cost of the sintered hard alloy rod.

In further testing of a method according to the present invention, it was confirmed that an even higher bonding strength of junction 13 can be obtained by forming the bond in an argon or nitrogen gas environment, as described in Japanese patent application No. 6-199580.

In the case of small diameter drill bits used for printed circuit board processing, however, the bonding strength obtained in utilizing the method of the present invention as described above is sufficiently high, and it is therefore recommended to joint the parts in an open-air-atmosphere, thus reducing costs.

What is claimed is:

1. A method of joining a sintered hard alloy member to a metal member comprising the steps of;
    a. pressing an end face of said sintered hard alloy member against an end face of said metal member with a predetermined force sufficient to establish an electrically conductive contact region between said end faces, said end face of said sintered hard alloy member being flat and said end face of said metal member having a convex conical shape with a vertex angle which is greater than about 150 degrees and less than about 180 degrees, and
    b. passing a pulse of electrical current through said contact region of sufficient magnitude and duration to weld said hard alloy member to said metal member.

2. The method of claim 1 wherein said sintered hard alloy member and said metal member are each connected to a separate electrode during passage of said current pulse through said contact region.

3. The method of claim 2 wherein a main component of said sintered hard alloy member is tungsten carbide.

4. The method of claim 3 wherein a main component of said metal member is stainless steel.

5. The method of claim 1 wherein said end face of said convex conical part of said metal member has a diameter which is no larger than the diameter of said sintered hard alloy member.

6. The method of claim 1 wherein said pulse of current is controlled to deliver to said contact region between said hard alloy member and said metal member an energy pulse having a predetermined magnitude of between about 100 watt-seconds and about 200 watt-seconds.

7. The method of claim 6 wherein said current pulse has a duration of between about 2 milliseconds and about 10 milliseconds.

8. The method of claim 7 wherein said current pulse has a duration of about 4 milliseconds.

9. The method of claim 1 wherein said predetermined force is between about 49 Newtons and about 120 Newtons.

10. The method of claim 9 wherein said force is about 102 Newtons.

11. The method of claim 1 wherein said predetermined force exerts a pressure on said contact region of between about $4 \times 10^6$ kgf/meter$^2$ and about $11 \times 10^6$ kgf/meter$^2$.

12. The method of claim 1 wherein said contact region has a diameter of about 1.2 mm.

13. The method of claim 12 wherein said predetermined force is between about 49 Newtons and 120 Newtons.

14. The method of claim 1 further including the step of producing cutting edges in said hard alloy member.

15. The method of claim 1 further including the step of forming a cutting end portion of a drill bit for printed circuit board processing of said hard alloy member.

16. A method of joining a sintered hard alloy member to a metal member comprising the steps of;
   a. connecting a first electrode to said hard alloy member,
   b. connecting a second electrode to said metal member,
   c. pressing an end face of said sintered hard alloy member against an end face of said metal member with a predetermined force sufficient to establish an electrically conductive contact region between said end faces, said end face of said metal member has a convex conical shape with a vertex angle of between about 150 degrees and about 180 degrees, and
   d. connecting said electrodes to a source of electrical energy which causes a pulse of current to flow through said contact region of sufficient magnitude and duration to thereby weld said hard alloy member to said metal member.

17. The method of claim 16 wherein said end face of said convex conical part of said metal member has a diameter which is no larger than the diameter of said sintered hard alloy member.

18. The method of claim 17 wherein a main component of said sintered hard alloy member is tungsten carbide.

19. The method of claim 18 wherein a main component of said metal member is stainless steel.

20. The method of claim 18 wherein said metal member has a diameter of about 1.2 mm.

21. The method of claim 20 wherein said pulse of current is controlled to deliver a predetermined energy pulse to said contact region between said hard alloy member and said metal member of between about 100 watt-seconds and 200 watt-seconds.

22. The method of claim 21 wherein said energy pulse is further defined as having a magnitude of about 120 watt-seconds.

23. The method of claim 21 wherein said current pulse has a duration of between about 2 milliseconds and about 10 milliseconds.

24. The method of claim 23 wherein said current pulse has a duration of about 4 milliseconds.

25. The method of claim 24 wherein said predetermined force is between about 49 Newtons and about 120 Newtons.

26. The method of claim 25 wherein said force is about 102 Newtons.

27. The method of claim 26 wherein said predetermined force exerts a pressure on said contact region of between about $4 \times 10^6$ kgf/meter$^2$ and about $11 \times 10^6$ kgf/meter$^2$.

28. The method of claim 27 wherein said contact region has a diameter of about 1.2 mm.

29. The method of claim 28 wherein said predetermined force is between about 49 Newtons and 120 Newtons.

30. The method of claim 29 further including the step of producing cutting edges in said hard alloy member.

31. The method of claim 30 further including the step of forming a cutting end portion of a drill bit for printed circuit board processing of said hard alloy member.

32. A method of joining a sintered hard alloy member to a metal member comprising the steps of;
   a. pressing an end face of said sintered hard alloy member against an end face of said metal member with a predetermined force sufficient to establish an electrically conductive contact region between said end faces, said end face of said metal member having a smaller diameter than the diameter of said sintered hard alloy member, and
   b. passing a pulse of electrical current through said contact region of sufficient magnitude and duration to weld said hard alloy member to said metal member.

33. The method of claim 32 wherein said sintered hard alloy member and said metal member are each connected to a separate electrode during passage of said current pulse through said contact region.

34. The method of claim 33 wherein a main component of said sintered alloy member is tungsten carbide.

35. The method of claim 34 wherein a main component of said metal member is stainless steel.

36. The method of joining a sintered hard alloy member to a metal member of claim 35 wherein a joint surface of said hard alloy member is flat and a joint surface of said metal member has a conical shape with a vertex angle which is greater than about 150 degrees and less than about 180 degrees.

37. The method of claim 36 wherein said end face of said convex conical part of said metal member has a diameter which is no larger than the diameter of said sintered hard alloy member.

* * * * *